(12) United States Patent
Sherlock

(10) Patent No.: US 11,822,802 B2
(45) Date of Patent: Nov. 21, 2023

(54) SIMPLIFIED RAID IMPLEMENTATION FOR BYTE-ADDRESSABLE MEMORY

(71) Applicant: Hewlett Packard Enterprise Development LP, Houston, TX (US)

(72) Inventor: Derek Alan Sherlock, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 149 days.

(21) Appl. No.: 17/558,260

(22) Filed: Dec. 21, 2021

(65) Prior Publication Data

US 2023/0195340 A1    Jun. 22, 2023

(51) Int. Cl.
*G06F 12/00* (2006.01)
*G06F 3/06* (2006.01)

(52) U.S. Cl.
CPC ............ *G06F 3/064* (2013.01); *G06F 3/0619* (2013.01); *G06F 3/0656* (2013.01); *G06F 3/0659* (2013.01); *G06F 3/0689* (2013.01)

(58) Field of Classification Search
USPC ........................................................ 711/114
See application file for complete search history.

(56) References Cited

U.S. PATENT DOCUMENTS

| | | | |
|---|---|---|---|
| 4,491,946 A | 1/1985 | Kryskow, Jr. et al. | |
| 7,340,743 B1 | 3/2008 | Anural et al. | |
| 7,739,245 B1 | 6/2010 | Agarwal et al. | |
| 7,779,176 B2 | 8/2010 | Almalki et al. | |
| 8,869,006 B2 * | 10/2014 | Blaum ................ | G06F 11/1076 714/6.2 |
| 9,602,615 B2 | 3/2017 | Thiyam et al. | |
| 10,037,364 B1 | 7/2018 | Kalinichenko et al. | |
| 2002/0159401 A1 | 10/2002 | Boger | |
| 2017/0034252 A1 | 2/2017 | Wong | |
| 2017/0286215 A1 * | 10/2017 | Gerhard ................ | G06F 3/0689 |
| 2020/0026603 A1 * | 1/2020 | Harwood ............ | G06F 11/1407 |
| 2020/0133777 A1 | 4/2020 | Lesartre et al. | |

FOREIGN PATENT DOCUMENTS

GB          2146810          4/1985

* cited by examiner

*Primary Examiner* — Mardochee Chery
(74) *Attorney, Agent, or Firm* — Yao Legal Services, Inc.

(57) ABSTRACT

One aspect of the instant application can provide a storage system. The storage system can include a plurality of byte-addressable storage devices and a plurality of media controllers. A respective byte-addressable storage device is to store a parity block or a data block of a data stripe, and a respective media controller is coupled to a corresponding byte-addressable storage device. Each media controller can include a tracker logic block to serialize critical sections of multiple media-access sequences associated with an address on the corresponding byte-addressable storage device. Each media-access sequence comprises one or more read and/or write operations, and the data stripe may be inconsistent during a critical section of a media-access sequence.

20 Claims, 11 Drawing Sheets

SIMPLIFIED RAID IMPLEMENTATION FOR BYTE-ADDRESSABLE MEMORY

BACKGROUND

This disclosure is generally related to the redundant array of independent disks (RAID) technology. More specifically, this disclosure is related to implementing RAID for byte-addressable memory devices.

BRIEF DESCRIPTION OF THE FIGURES

In the figures, like reference numerals refer to the same figure elements.

DETAILED DESCRIPTION

Figure 1:
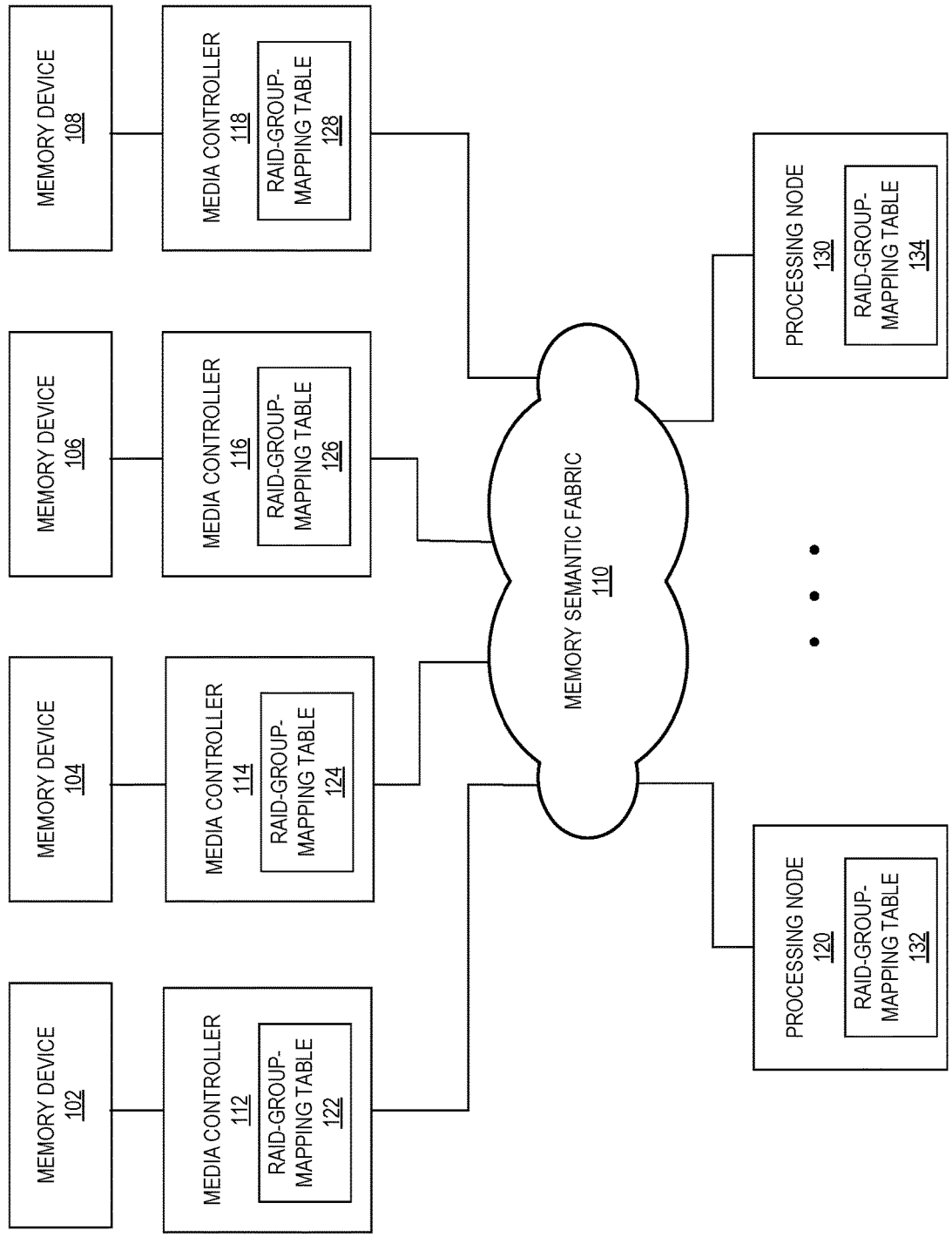
FIG. 1 illustrates a memory system implementing redundant array of independent disks (RAID), according to one aspect of the instant application.

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

The disclosure provides a simplified implementation of redundant array of independent disks (RAID) for byte-addressable memory (e.g., storage class memory (SCM)) devices. The disclosed memory system includes a plurality of memory devices, with each memory device coupled to a media controller and each media controller maintaining a RAID-group-mapping table. The media controllers cooperatively provide RAID functionality at a granularity level suitable for the byte-addressable memory, e.g., at the cache-line level. Note that although the term RAID is used here, the memory devices described in this disclosure are not necessarily associated with a disk or disks. The memory devices can include solid-state byte-addressable storage devices. The term "RAID" is loosely used here to imply the use of redundant arrays of memory devices, using checksum and protection schemes similar to those used in traditional RAID systems, but applied to the solid-state byte-addressable memory devices. The RAID checksum scheme used by the various examples disclosed herein uses an exclusive OR (XOR) function, where the parity way of a RAID stripe stores a bitwise XOR of the values in each of the stripe's data ways. This XOR checksum scheme is exemplary only and other more advanced checksum schemes can also be used. The scope of this disclosure is not limited by the type of checksum scheme.

During a write operation, which requires pre-write data and pre-write parity to be read from the data way and the parity way, respectively, the data-way and parity-way media controllers exchange three messages. More specifically, upon receiving a write request, the data-way media controller sends a sequence-start message to the parity-way controller before starting its own read operation, thus allowing the pre-write data read and the pre-write parity read to be performed concurrently. While the read operations are being performed, the tracker in the data-way media controller is occupied to delay other access to the same access address. Moreover, the tracker in the parity-way media controller is also occupied to delay access to the parity way on behalf of other data ways. The data-way media controller releases its tracker and sends a sequence-done message to the parity-way media controller after receiving an ACK to the sequence-start message and after the completion of reading the pre-write data and writing the post-write data. The parity-way media controller releases its tracker upon receiving the sequence-done message. This way, the tracker on the parity-way media controller can serialize accesses (including read and write accesses) to the same stripe address (e.g., memory blocks on the same stripe). More specifically, accesses to the same stripe address can be serialized to prevent race-condition hazards among multiple accesses to different data ways belonging to the same stripe. Compared to existing approaches, this solution significantly reduces implementation complexity.

Redundant array of independent disks (RAID) is a well-known data storage virtualization technology to provide data redundancy in a storage system. However, the prolonged transaction-processing time of conventional software-based RAID techniques makes them not suitable for byte-addressable memory devices, such as storage class memory (SCM) devices and dynamic-random access memory (DRAM) devices. Existing hardware-based RAID techniques specially designed for byte-addressable memory often require complex hardware logics for implementation.

The solution disclosed herein improves on the existing RAID implementation for byte-addressable memory by reducing the complexity of the hardware logics used for enabling RAID on media controllers of the byte-addressable memory devices.

FIG. 1 illustrates a memory system implementing RAID, according to one aspect of the instant application. Memory system 100 can include a plurality of byte-addressable memory devices (e.g., memory devices 102, 104, 106, and 108), a plurality of RAID-enabled media controllers (e.g., media controllers 112, 114, 116, and 118), a memory semantic fabric 110, and one or more processing nodes (e.g., processing nodes 120 and 130).

Memory devices 102-108 can be byte-addressable memory devices, such as SCM devices or DRAM devices.

Each memory device can be coupled to a RAID-enabled media controller. For example, byte-addressable memory device 102 is coupled to RAID-enabled media controller 112. Each RAID-enabled media controller can handle media-access functions (e.g., processing read and write requests) like conventional media controllers. Moreover, each RAID-enabled media controller can include logic blocks for performing RAID-specific functions. For example, each RAID-enabled media controller can access a RAID-group-mapping table that stores information useful for performing RAID-specific functions. In FIG. 1, media controllers 112, 114, 116, and 118 respectively access RAID-group-mapping tables 122, 124, 126, and 128. Media controllers 112-118 provide RAID functionality at the granularity at which memory devices 102-108 are most frequently addressed, without employing a master RAID controller. In other words, all media controllers are similarly configured peer controllers. For instance, this granularity may be a cache line granularity at which processing nodes 120 and 130 cache data stored within memory devices 102-108, such as 64 bytes.

Memory semantic fabric 110 is used to interconnect processing nodes and memory devices, permitting a processing node to access the memory devices (e.g., sending memory-semantic requests) regardless of where the memory devices are located on the fabric. Memory-semantic requests can include read requests, write requests, requests for atomic operations, etc. Memory semantic fabric 110 can include an underlying high-speed input/output (I/O) network that can connect the processing nodes to the physical media, at potentially significantly longer distances than otherwise possible. According to one aspect, memory semantic fabric 110 can include a Gen-Z memory fabric. According to a further aspect, memory semantic fabric 110 can include one or more switches (e.g., SCM switches) and other components that physically interconnect the media controllers with the processing nodes. Read and write requests issued by the processing nodes can cause the media controllers of the processing nodes to correspondingly communicate with the media controllers of the memory devices over the memory semantic fabric 110 to facilitate the media controllers to perform the read and write operations on the attached memory devices.

In the example shown in FIG. 1, there are two processing nodes and four media controllers. In practice, the number of processing nodes can be larger or smaller than the number of media controllers. A processing node can be a computing device capable of issuing read/write requests to memory devices. Each processing node can include one or more processors, with each processor having one or more processing cores. Examples of a processing node can include, but are not limited to: a CPU, a GPU, an input/output (I/O) device, an accelerator, a network interface card (NIC), etc. A processing node can include one or more media controllers that may be integrated within their processors or external to the processors. The processing cores of a processor may each include multiple caches, such as level-one (L1) and level-two (L2) caches, and multiple cores of the same processor can share another cache, such as a level-three (L3) cache. Each processing node can also access the RAID-group-mapping table. For example, processing node 120 can access RAID-group-mapping table 132 and processing node 120 can access RAID-group-mapping table 134. Note that all RAID-group-mapping tables store identical information. Details about the RAID-group-mapping table will be provided later.

Figure 2:
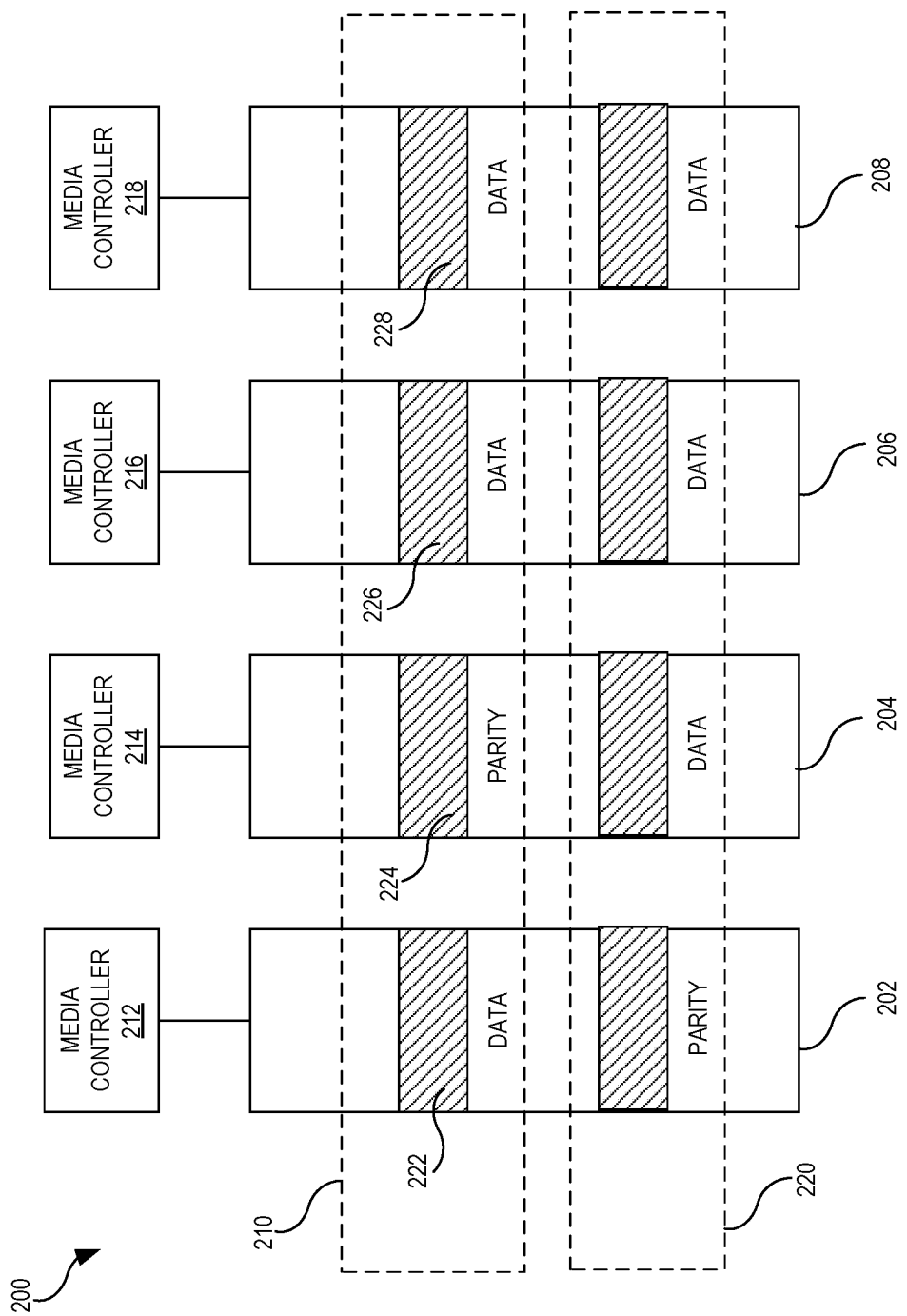
FIG. 2 illustrates a RAID group across multiple byte-addressable memory devices, according to one aspect of the instant application.

FIG. 2 illustrates a RAID group across multiple byte-addressable memory devices, according to one aspect of the instant application. In FIG. 2, RAID group 200 includes a number of byte-addressable memory devices (e.g., memory devices 202-208), each memory device being coupled to its own media controller (e.g., media controllers 212-218). FIG. 2 also shows a RAID stripe 210 that spreads across multiple byte-addressable memory devices. In this example, RAID stripe 210 can include a number of data blocks (e.g., data blocks 222-228) that are respectively located on multiple memory devices (e.g., memory devices 202-208), with one of the data blocks (e.g., block 204) storing parity data while other data blocks store the data. According to one aspect, the size of each data block can be the same as the width of a cache line (e.g., 64 bytes). Note that, for each RAID stripe, a memory device that stores the user data is referred to as a data-way device for that RAID stripe, whereas the memory device that stores the parity data is referred to as the parity-way device for that RAID stripe. Similarly, a corresponding media controller can be referred to as a data-way media controller or the parity-way media controller for that RAID stripe. In the example shown in FIG. 2, media controller 214 is the parity-way media controller for RAID stripe 210, whereas all other media controllers are data-way media controllers for RAID stripe 210. Also note that, for different stripes, the parity data may be stored on different memory devices. FIG. 2 also shows that parity data for RAID stripe 220 is stored on memory device 202. With respect to RAID stripe 220, memory device 202 is the parity-way device and media controller 212 is the parity-way media controller. As shown in FIG. 2, a RAID group can store many RAID stripes, and the parity data for the different stripes can be scattered across the multiple memory devices to prevent excessive wear of any particular memory device, and to balance traffic among the multiple memory devices. In other words, for a particular memory-access operation (e.g., read or write operation), depending on the memory address being accessed (e.g., the RAID stripe being accessed), one media controller can be referred to as the parity-way media controller, one as the data-way media controller, and the other media controllers are not directly involved, except when required for error correction purposes.

Each media controller can access a RAID-group-mapping table that stores information associated with the RAID group. Each entry in the RAID-group-mapping table can describe one RAID group, and is looked up whenever a memory access targets any access address mapped to that RAID group. The information looked up in the table, in combination with the access address, are sufficient to unambiguously identify parity-way and data-way media controllers associated with any given access address. For example, the table may specify the number of media controllers and an ordered list of their identities. Arithmetic and logic operations acting on a subset of the address bits may serve as an interleave function, determining which controller within the table-supplied list serves as the data-way controller and which as the parity-way controller for the given access address. In one example, a controller can use the access address and information included in the mapping table (which lists all controllers and the interleaving scheme) to perform a calculation to determine which controller is the parity controller and which controllers are the corresponding data controllers in a stripe.

An entry in the RAID-group-mapping table can include identity information associated with media controllers involved in the RAID group. Moreover, the table entry can provide enough information to unambiguously determine the parity-way/data-way media controller for any given access address. According to one aspect, the table may contain only one entry, and all memory capacity under the control of the media controller is mapped to a single RAID group. According to another aspect, the table may contain multiple entries, and the memory capacity under the control of the media controller may be subdivided or partitioned among multiple RAID groups, each responsive to a different range of access addresses.

A RAID stripe is considered to be consistent when all of its ways can be read, and the value stored in its parity-way device is a correct checksum of the values stored in its various data-way devices. A RAID stripe is inconsistent if all of its ways can be read, but the value stored in its parity-way device is not a correct checksum of the values stored in its various data-way devices. A RAID stripe is correctable when it was previously consistent, but one of its ways incurred a device failure, rendering it unreadable. Since it was consistent prior to the failure, the data associated with the unreadable way can be reconstructed from the surviving ways.

A RAID system must leave each stripe in a consistent state upon completion of each access wherever possible, or in a correctable state if a device failure makes it impossible to achieve a consistent state. The RAID system may leave a stripe in an uncorrectable state upon completion of an access only if more than one of the ways is unreadable. This represents data loss beyond the protection capability of the RAID scheme. The RAID system should never leave a stripe in an inconsistent state under any circumstances since that would result in silent data corruption in the event of a subsequent device failure.

The inherent race condition between the updates to data and parity values stored in their respective memory devices can result in a momentarily inconsistent stripe state during a write sequence. Without further precautions, the failure of another data-way device within the same RAID stripe could result in a rebuild sequence using these momentarily inconsistent stripe values, resulting in corrupt rebuilt data. To avoid this hazard, stripe rebuild sequences should be serialized so that they don't occur concurrently with writes to the same stripe. Since both rebuild and write sequences are orchestrated by the stripe's parity way, the parity-way media controller may provide the mechanism for enforcing this serialization.

The portions of stripe accesses which must be serialized for any given stripe to avoid the aforementioned data corruption hazards are termed critical sections. In the case of write accesses, the critical section is any time when the stripe contents may be momentarily inconsistent—when the data have been updated but not the parity way, or vice-versa. In the case of rebuild sequences, the critical section begins when the first read is issued for the purposes of computing the rebuild data, and ends when the last such read has completed, and if applicable the rebuilt data has been written back to the appropriate data-way device.

It should be noted that inherent same-address serialization by a processing node, e.g. due to its caching architecture, is insufficient to ensure the required serialization of these critical sections. Processing nodes that perform such serialization can still issue multiple concurrent accesses to different data addresses that correspond to different data ways within the same stripe. Furthermore, multiple concurrent accesses to the same stripe or even the exact same data address can also occur in a RAID system that allows multiple processing nodes to access the storage array via a memory semantic fabric as shown in FIG. 1. Existing approaches to serialize the critical sections of multiple concurrent stripe accesses require a complex implementation scheme. For example, they may require all accesses to pass through a single controller that performs the serialization but introduces a performance bottleneck. Or, they may require explicit lock tracking by a media controller, and a corresponding explicit locking and unlocking handshake using messages between data-way and parity-way media controllers, or between processing nodes and media controllers. To ensure the stripe or parity consistency in a simpler manner, the disclosed solution uses write and rebuild sequences such that the tracker on the data-way media controller serializes the critical sections of same-block accesses, and the tracker on the parity-way media controller serializes the critical sections of all other same-stripe accesses. This ensures that the critical section of a subsequent write or rebuild operation to the same stripe cannot begin while the critical section of an earlier write or rebuild operation is still in progress.

Figure 3:
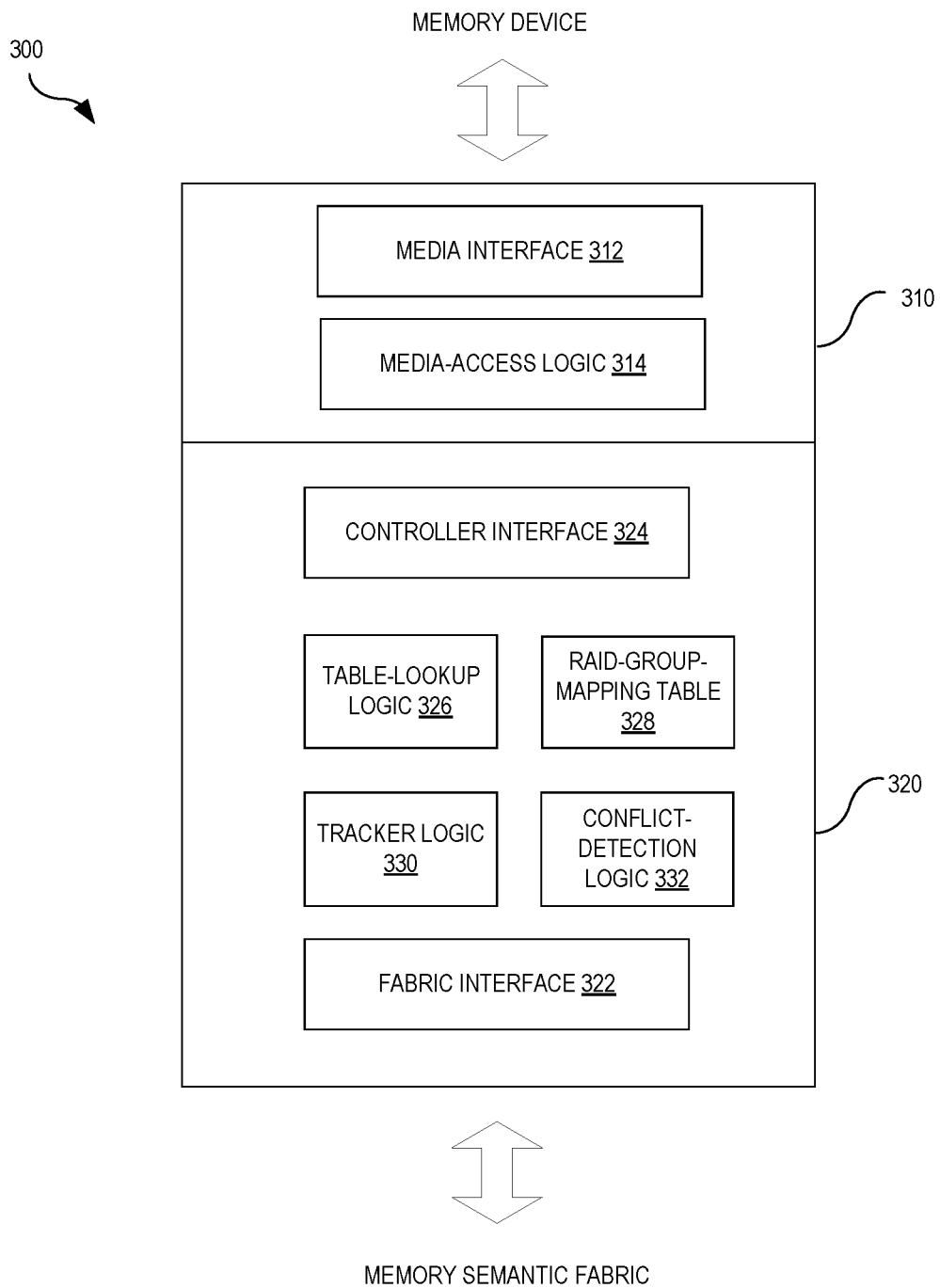
FIG. 3 illustrates a block diagram of a RAID-enabled media controller, according to one aspect of the instant application.

FIG. 3 illustrates a block diagram of a RAID-enabled media controller, according to one aspect of the instant application. In FIG. 3, a RAID-enabled media controller 300 can include a media controller sub-block 310 and a RAID controller sub-block 320. Media controller sub-block 310 can be similar to a conventional media controller used in a storage system implementing a memory semantic fabric. More specifically, media controller sub-block 310 can include a media interface 312 for interfacing with the attached memory device and a media-access logic 314 that manages various aspects of media-access operations (e.g., reads, writes, write buffering, wear leveling, etc.) that are specific to the media type of the attached memory device (e.g., DRAM, flash, memristor, etc.). RAID controller sub-block 320 can be responsible for receiving memory-semantic requests (e.g., reads, writes, access for atomic operations, etc.) from request sources (e.g., processing nodes), performing various RAID-specific functions, and using media controller sub-block 310 to perform reads and writes of data and parity blocks.

RAID controller sub-block 320 can include a fabric interface 322, a controller interface 324, a table-lookup logic 326, a RAID-group-mapping table 328, a tracker logic 330, and a conflict-detection logic 332. The various logic blocks in RAID controller sub-block 320 can be implemented as hardware logic, which can provide higher efficiency and faster speed for performing the various RAID-related functions than software-based solutions. Fabric interface 322 interfaces with the memory semantic fabric. More specifically, fabric interface 322 can receive, via the memory semantic fabric, read and write requests from the processing nodes and send responses for completed requests. Moreover, fabric interface 322 can send and receive messages to and from other media controllers to facilitate various RAID-related operations (e.g., requests for data or parity).

Controller interface 324 interfaces with media controller sub-block 310 and can be responsible for sending read and write requests to media controller sub-block 310. Controller interface 324 can also receive data or error messages from media controller sub-block 310.

Table-lookup logic 326 can be responsible for looking up RAID-group-mapping table 328, which stores information useful for RAID operations. For example, RAID-group-mapping table 328 can store information regarding the number and identity of peer RAID-enabled media controllers. For each RAID group, RAID-group-mapping table 328 can store information that identifies all of the way controllers, and allows the identity of the parity-way controller as well as the data-way controller to be determined as a function of the address within the RAID group.

Tracker logic 330 can be responsible for tracking the state and progress of all requests (either read or write requests) being processed. Tracker logic 330 can generate a tracker entry for each in-progress request and close or delete the entry upon completion of all activities associated with the request, including media access, interaction with the memory controllers, and the sending of the responses.

Conflict-detection logic 332 can be responsible for detecting, based on active tracker entries in tracker logic 330, that a newly received request is targeting a same address as an in-progress request. Accordingly, conflict-detection logic 332 can delay the execution of the newly received request until the previous request is completed. In other words, requests to the same address can be serialized, one at a time, by conflict-detection logic 332. In the data way, when multiple processing nodes attempt to access the same address (e.g., write to the same address), conflict-detection logic 332 can ensure that the multiple requests would be serialized to prevent stripe consistency race conditions. Similarly, when there are multiple requests for different data ways within the same RAID stripe, accesses to the corresponding parity way can be serialized by conflict-detection logic 332 to prevent stripe consistency race conditions.

Figure 4:
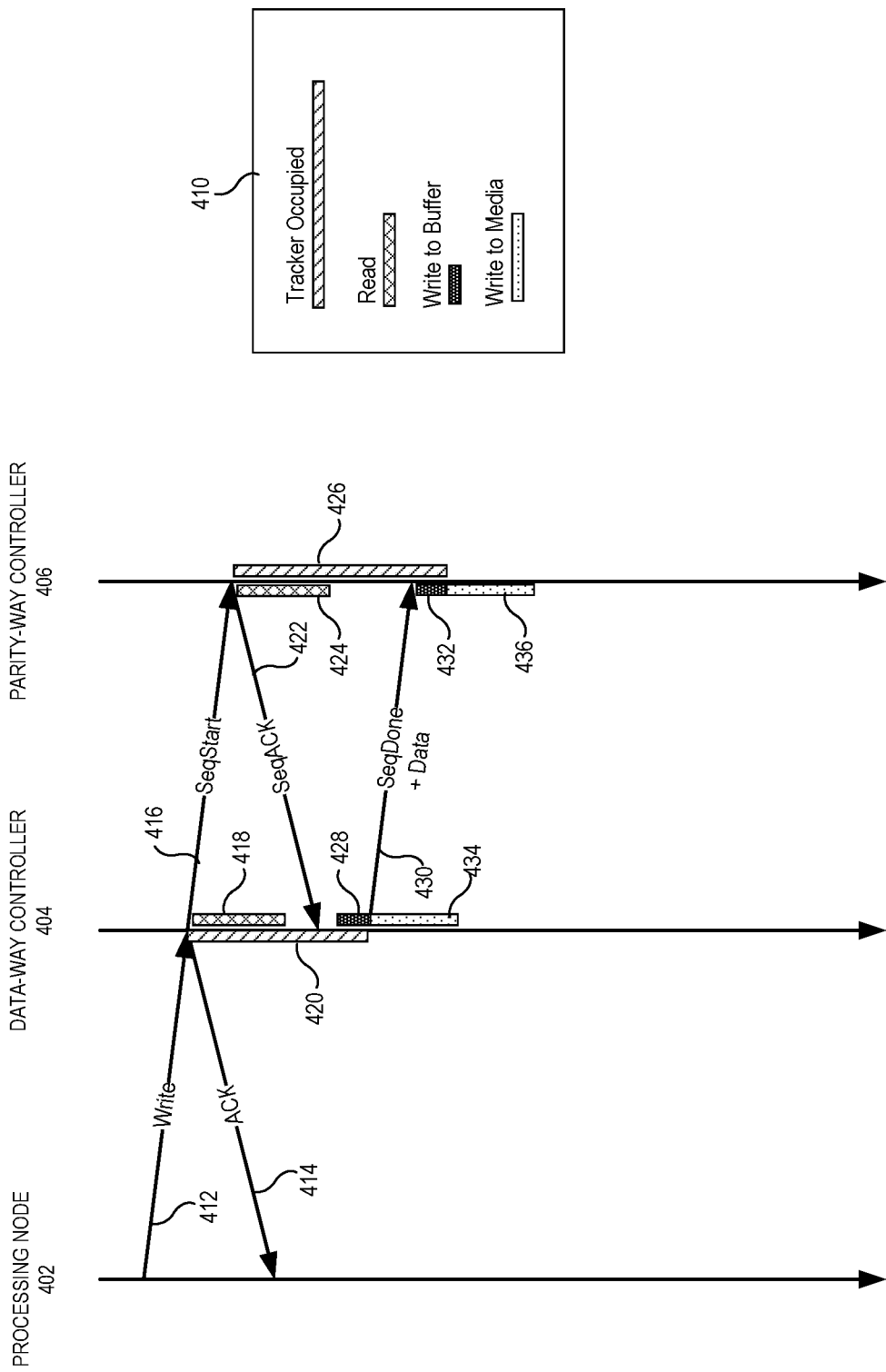
FIG. 4 illustrates a write sequence, according to one aspect of the instant application.

FIG. 4 illustrates a write sequence, according to one aspect of the instant application. For an error-free write sequence, there can be three parties involved: a processing node 402 that sends the write request, a data-way controller 404 that writes into the corresponding address in the media, and a parity-way controller 406 that updates the parity data. Note that computing the updated parity data can depend upon the values of both the pre-write data and the pre-write parity. Both data-way controller 404 and parity-way controller 406 are RAID-enabled media controllers. Note that a controller is referred to as a data-way or parity-way controller based on whether its corresponding memory device stores user data or parity at the address specified by the write request.

Moreover, multiple events (e.g., read, write, tracker-occupied, etc.) can occur on the same entity, with each event consuming a different amount of time. For better understanding of the timing of the different events, FIG. 4 uses progress bars of different patterns to represent the different events. The correspondence between the progress bars and the different events is shown in a legend field 410 in FIG. 4A. Note that similar drawing notations are used throughout this disclosure.

During a write operation, processing node 402 sends a write request 412 to data-way controller 404. It is assumed that the processing node 402 also stores the RAID-group-mapping information such that processing node 402 can identify which RAID-enabled media controller to send the write request to. In this example, based on the memory address specified in write request 412, processing node 402 sends the request to data-way controller 404. Upon receiving write request 412, data-way controller 404 may send an acknowledgment (ACK) response 414 back to processing node 402. The timing for sending ACK response 414 can depend on the actual implementation. Instead of sending ACK response 414 right after receiving write request 412, alternatively, data-way controller 404 can send ACK response 414 after the completion of a later phase of he write operation (e.g., after completion of the data way write-to-media event 434). FIG. 4 depicts the earliest that ACK 414 can be issued by the data-way controller 404, coincident with the allocation of a tracker 420. The tracker occupancy guarantees that any subsequent same-address read request issued after to the processing node's receipt of ACK response 414 will be serialized at least until the data from write request 412 has been written to the buffer, and is thus visible to subsequent reads.

Upon receiving write request 412, the tracker logic in data-way controller 404 generates a tracker entry for the address (tracker-occupied event 420). In addition, data-way controller 404 sends a sequence-start (SeqStart) message 416 to parity-way controller 406 to notify parity-way controller 406 of the start of the write sequence. To do so, data-way controller 404 can look up the RAID-group-mapping table to determine which peer controller is the parity-way controller. Data-way controller 404 also reads the data currently stored at the address specified by the write request (read event 418). The data currently stored at the address can be referred to as pre-write data to distinguish it from the data to be written into the address. Data-way controller 404 can be configured such that additional access to this address will be delayed within the duration of tracker-occupied event 420 to serialize accesses to this address.

Upon receiving sequence-start message 416, the tracker logic in parity-way controller 406 generates a tracker entry for the parity address (tracker-occupied event 426). In addition, parity-way controller 406 sends a sequence-acknowledgment (SeqACK) message 422 to acknowledge the allocation of the tracker (tracker-occupied event 426) for the write sequence. Parity-way controller 406 reads the current parity data, referred to as the pre-write parity (read event 424). Similar to data-way controller 404, parity-way controller 406 can be configured such that additional same-stripe accesses to the parity way will be delayed until the completion of tracker-occupied event 426 to serialize accesses to the stripe. Note that within a given stripe, the media address of the data and the media address of the parity are identical, and can be referred to as a RAID stripe address. Since there are multiple data ways per stripe, there are multiple access addresses associated with a single stripe address. The stripe address is not the same as the access address (e.g., the memory address used by the processor to issue a memory-semantic request). Also note that the stripe address of a data/parity block indicates at which stripe of the media (i.e., memory device) the data/parity block resides. For example, in FIG. 2, data/parity blocks 222-228 have the same stripe address. Each access address can be uniquely mapped to a (stripe-address, data-way) tuple.

Read event 424 can start before the completion of read event 418. In fact, the reading of the pre-write data and the reading of the pre-write parity can be performed substantially in parallel (given the little amount of transmission time for sequence-start message 416), thus improving the write efficiency compare with conventional approaches where the reading of the pre-write parity occurs after the reading of the pre-write data.

Any media write operation can in fact include two events, a write-to-buffer event (when the data is written into a write buffer) and a write-to-media event (when the data is written into the storage medium). Once the data is written into the write buffer, the data will become visible to subsequent read operations as data stored in the specified address. Hence, the write operation can be considered finished, although actually writing the data to the storage medium may take time. Similar to data-way controller 404, parity-way controller 406 can be configured such that additional same-stripe access to the parity way will be delayed until the completion of tracker-occupied event 426, thus serializing the critical sections, as required to avoid data corruption hazards.

Returning to data-way controller 404, upon the completion of reading the pre-write data with no error, data-way controller 404 can write the data included in write request 412 to the write buffer (write-to-buffer event 428). Once the write is completed (e.g., write-to-buffer event 428 is successfully finished) and sequence-acknowledgment message 422 is received, the tracker logic in data-way controller 404 can close tracker-occupied event 420 (e.g., by releasing the tracker for this address) to allow subsequent access to the address. Note that the tracker on the data-way is released only after the successful read and write (e.g., successful or error-free completion of read event 418 and write event 428) and that write-to-buffer event 428 only begins after the receipt of sequence-acknowledgment message 422.

After successfully writing the data to the write buffer, data-way controller 404 can send a sequence-done message 430 along with the data to parity-way controller 406. Upon receiving the data, parity-way controller 406 updates the parity (e.g., by performing an XOR operation based on the pre-write parity and the received data) and writes the updated parity to the write buffer (write-to-buffer event 432). Once the updated parity is successfully written to the write buffer, the tracker logic in parity-way controller 406 closes tracker-occupied event 426 (e.g., by releasing the tracker for the corresponding address). Note that the tracker on the parity-way is released only after receipt of sequence-done message 430 (which indicates the successful completion of the read and write activities, e.g., events 418 and 428, on the data way) and the successful completion of the read and write activities, e.g., events 424 and 432, on the parity way. FIG. 4 also shows write-to-media events 434 and 436 on the data way and the parity way, respectively. During these events, data and parity are transferred to the actual media. Their timings are less important, because the data and parity become visible to subsequent reads after they are written into the write buffer.

As shown in FIG. 4, both the data-way and parity-way media write operations associated with a single write request (e.g., request 412) occur entirely during the time that the parity-way tracker is occupied (i.e., during tracker-occupied event 426). Write-to-buffer event 428 on data-way controller cannot begin until the receipt of sequence-acknowledgment message 422, and the parity-way tracker remains occupied (i.e., event 426) until the completion of write-to-buffer event 432 on the parity-way and the receipt of sequence-done message 430, which in turn indicates the completion of write-to-buffer event 428 on the data way. Thus, the critical sections of a write sequence where the stripe may be become momentarily inconsistent, falls entirely within the duration of tracker-occupied event 426 on the parity way.

The value written to the stripe parity way is an XOR function of three data values: the pre-write parity, the pre-write data, and the to-be-written data. Parity-way controller 406 obtains the pre-write parity value via read event 424, but relies on messages from data-way controller 404 to obtain the other two values. In the example shown in FIG. 4A, both the pre-write data and to-be-written data may be sent to parity-way controller 406 along with sequence-done message 430. They may also be communicated as two separate values, or to save fabric bandwidth data-way controller 404 may combine them into a single value using an XOR function before sending. As another alternative, the to-be-written data may be sent along with sequence-start message 416, and the pre-write data could then be sent along with sequence-done message 430.

One can see from FIG. 4 that the data-way tracker is allocated (e.g. tracker-occupied event 420 is opened) before any media-access activities (read or write to buffer) on either data or parity way have begun, and released (e.g., tracker-occupied event 420 is closed) only after all media-access activities (read and write to buffer) on the data way are completed. Similarly, the parity-way tracker is allocated (i.e., tracker-occupied event 426 is opened) before any media-access activities (read or write to buffer) on either data or parity way have begun, and released (i.e., tracker-occupied event 426 is closed) only after all media-access activities (read and write to buffer) on both the parity way and the data way are completed. This can ensure consistency between the current parity and the current data.

Figure 5:
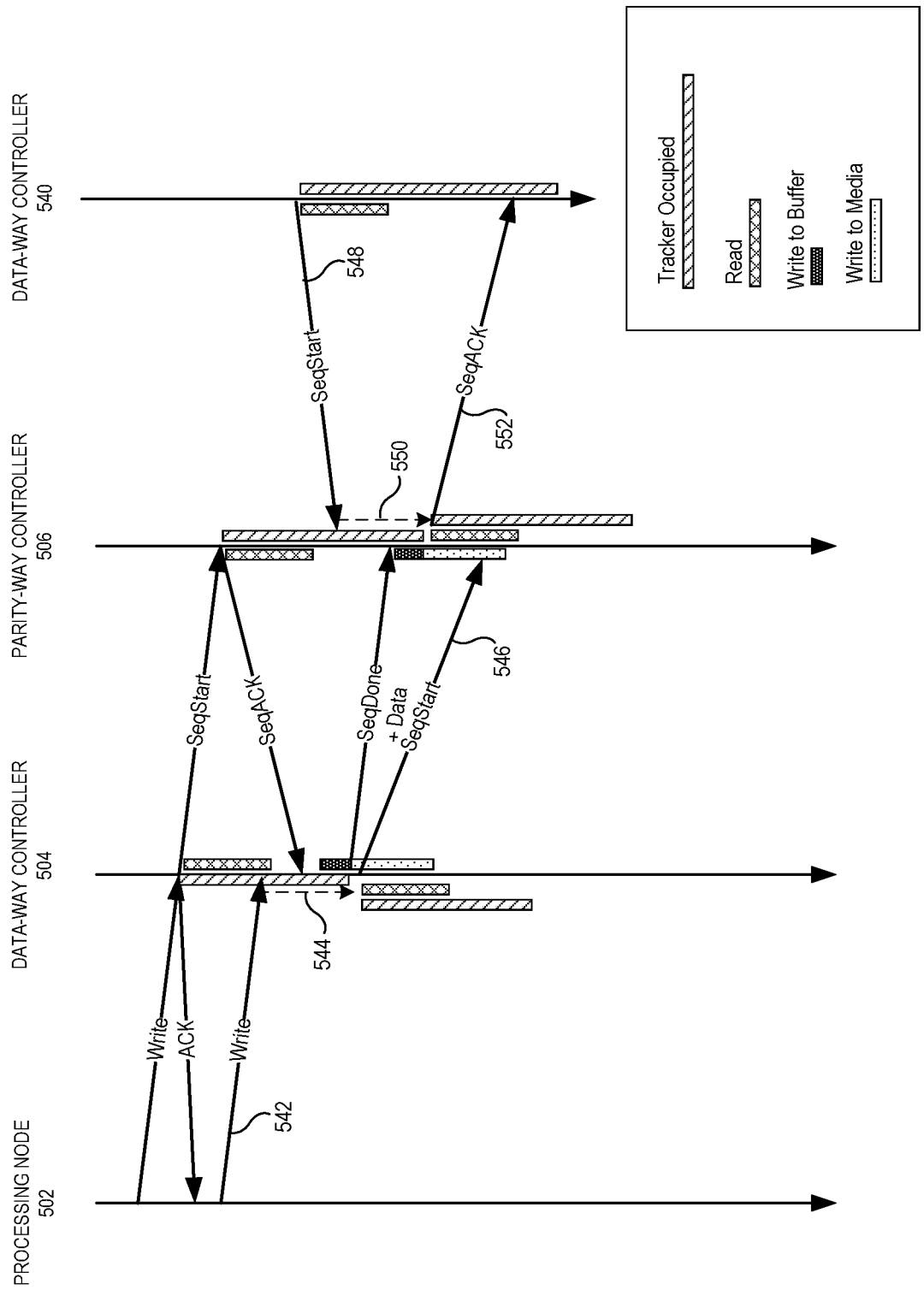
FIG. 5 illustrates the serialization of requests on the data way and the parity way, according to one aspect of the instant application.

As discussed previously, the trackers are essential for ensuring stripe consistency, because they force the serialization of accesses to the same address, including both the data way and the parity way. FIG. 5 illustrates the serialization on the data way and the parity way, according to one aspect of the instant application. Note that the data-way or parity-way controller shown in FIG. 5 is with respect to a particular RAID stripe. The same media controller may perform different roles (e.g., as either a data-way controller or a parity-way controller) for different RAID stripes, depending on whether the corresponding memory block in the RAID stripe stores data or parity. In FIG. 5, a processing node 502 sends a subsequent write request 542 to a controller 504 (which serves as a data-way controller for the particular stripe address and will be referred to as data-way controller 504 hereinafter). Write request 542 arrives at data-way controller 504 when the tracker for the previous write request at the same address is still occupied. Consequently, write request 542 is delayed for processing by data-way controller 504 until the tracker is released, as indicted by dashed arrow 544. Once the previous tracker is released, activities responsive to write request 542 (e.g., sending a sequence-start message 546, reading the data, starting a new tracker-occupied event, etc.) can proceed on data-way controller 504. This delay in starting a subsequent same-address write access ensures that the pre-write data used to calculate the eventual parity update for the write sequence responsive to request 542 is the value written by the prior write, guaranteeing that consecutive writes are sequentially consistent. The rest of the write operation can be similar to what is shown in FIG. 4 and will not be discussed in detail here.

FIG. 5 also shows that parity-way controller 506 receives a subsequent sequence-start message 548 for the same stripe address from another data-way controller 540 on behalf of a different access address that maps to a different data way of the same stripe, indicating that data-way controller 540 is performing a write operation. Sequence-start message 548 arrives at parity-way controller 506 when the tracker for a previous request for the parity data is still occupied. This means that the parity data may still contain the pre-write parity value. In such a situation, the processing of sequence-start message 548 is delayed until the tracker for the previous operation is released, as shown by dashed arrow 550. Once the previous tracker is released, activities responsive to sequence-start message 548 (e.g., starting a new tracker-occupied event, sending a sequence-acknowledgment message 552, reading the parity data, etc.) can proceed on parity-way controller 506. The rest of the write operation can be similar to what is shown in FIG. 4 and will not be discussed in detail here.

Figure 6A:
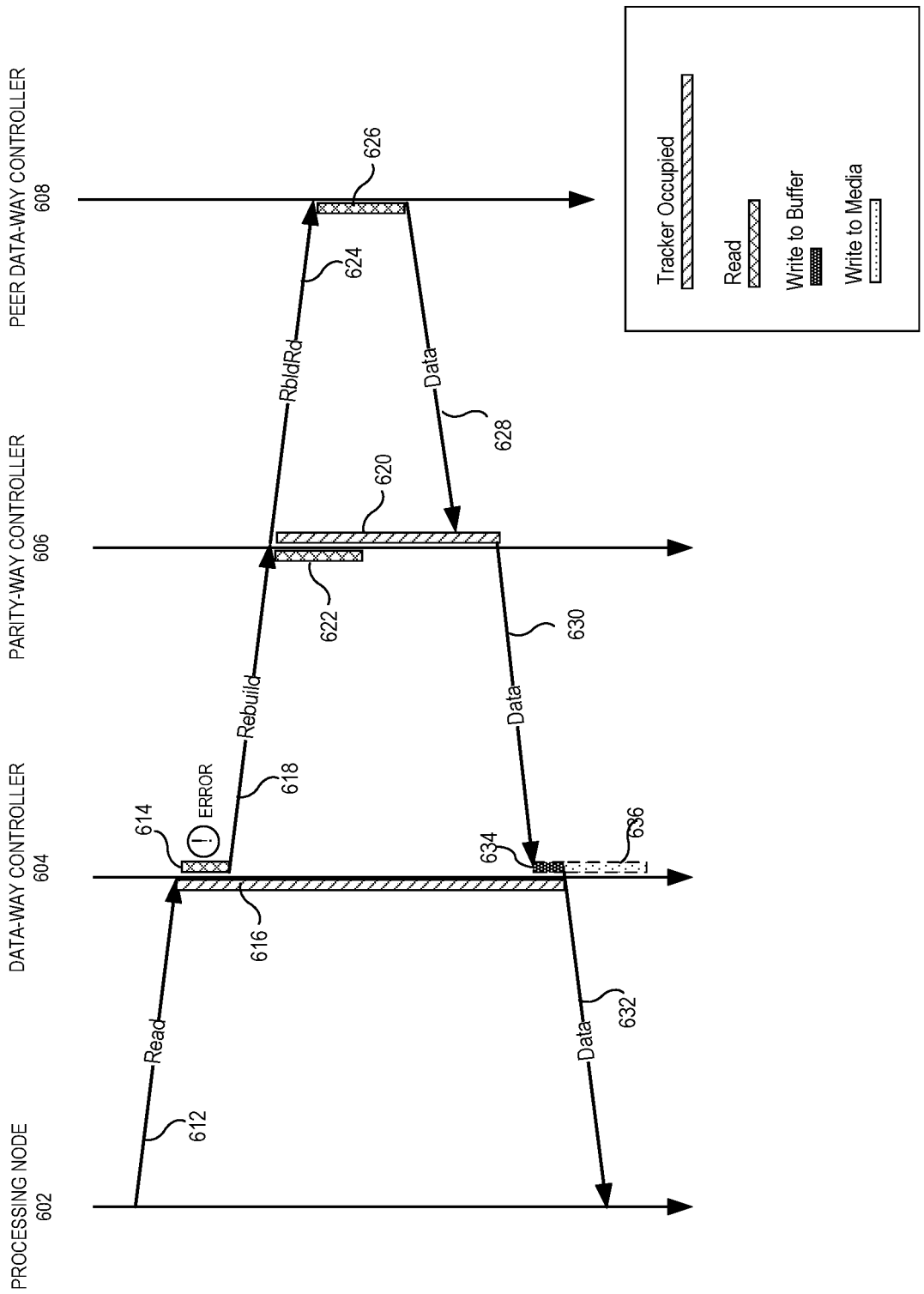
FIG. 6A illustrates a read sequence with a data error, according to one aspect of the instant application.

Stripe consistency a prerequisite for correction of data in the event of a media read failure, regardless of whether that media read is part of a write or a read access from a processor. FIG. 6A illustrates a read sequence which incurs a media read error on the data way, according to one aspect of the instant application. In FIG. 6A, a processing node 602 sends a read request 612 to a data-way controller 604. Upon receiving read request 612, data-way controller 604 starts a tracker-occupied event 616 and reads data (read event 614) stored at the address specified by read request 612. Note that if no error occurs, the data will be read and returned to processing node 602 and the tracker released. However, in the example shown in FIG. 6A, read event 614 encounters an error. Consequently, data-way controller 604 sends a rebuild message 618 to parity-way controller 606. As discussed previously, data-way controller 604 can look up its RAID-group-mapping table to identify which controller stores the parity-way data. A rebuild message is a special message used in RAID implementations. A rebuild message can be sent by a data-way controller to the parity-way controller, requesting the parity-way controller to initiate a rebuild sequence for its data, and to return that rebuild data value to the requesting data-way controller in a response message. The rebuild sequence can include the parity-way controller rebuilding the data value on behalf of the requesting data-way controller, by performing a checksum operation upon the parity value for the stripe stored in its media and the peer stripe data values from all of the peer data controllers in the RAID group. The parity controller obtains the stripe data values form the peer data controllers by sending each of them a rebuild-read (RbldRd) message, and receiving back a response containing the peer-way data for the stripe address.

The rebuild-read message can be similar to a read-request message, in that both messages can cause the targeted data-way media controller to read the specified data and return the value as a response message. However, a rebuild-read message does not allocate a tracker entry on the responding media controller, completes regardless of the pre-existing tracker occupancy for the stripe on the responding media controller, and does not take any corrective action in the event of a media read error. It either returns the read data or an error indication.

Upon receiving rebuild message 618, parity-way controller 606 can start its own tracker (tracker-occupied event 620), read the parity data (read event 622), and send a rebuild-read (RbldRd) message 624 to each peer data-way controller (e.g., controller 608). FIG. 6A shows one peer data-way controller. In practice, there can be multiple peer data-way controllers, and a rebuild-read message should be sent to each peer data-way controller. In response, each peer data-way controller (e.g., controller 608) reads its own data within the corresponding stripe (read event 626) and returns its own data to parity-way controller 606 using a message 628. Note that fabric and media controller design ensures that rebuild-read operations complete unconditionally—they may never be blocked by in-progress or in-flight read or write requests, rebuild requests, or sequence-start/sequence-acknowledgement/sequence-done-messages. Similarly, rebuild requests and sequence-start/sequence-acknowledgement/sequence-done-messages may never be blocked by in-progress or in-flight read or write requests.

Once data from all data-way controllers are received, parity-way controller 606 can rebuild the data for data-way controller 604 by XORing the data values from its parity media read (read event 622) and from all of the peer read responses (e.g., message 628), release the tracker (e.g., ending tracker-occupied event 620) and send the rebuilt data to data-way controller 604 using a message 630. Data-way controller 604 can then return the rebuilt data to processing node 602 using a message 632. Data-way controller 604 can optionally scrub the error by writing the rebuilt data into the media (write-to-buffer event 634 and write-to-media event 636). Depending on the type of error, the scrubbing write may or may not be successful. If the original error being corrected by the scrub was a "soft error" (e.g. bits flipped due to random conditions like alpha strikes), then the memory location may be successfully scrubbed. If the original error is a hardware failure (e.g. stuck-at failures of memory cells), scrubbing write to the memory location usually fails. Note that when scrubbing is performed, the tracker on data-way controller 604 will be released only after write-to-buffer event 634 is completed to maintain stripe consistency. If scrubbing is not performed or failed, data stored in the address remains unreadable or poisoned and the data-rebuilding process shown in FIG. 6A will be performed for each subsequent read to the address.

Figure 6B:
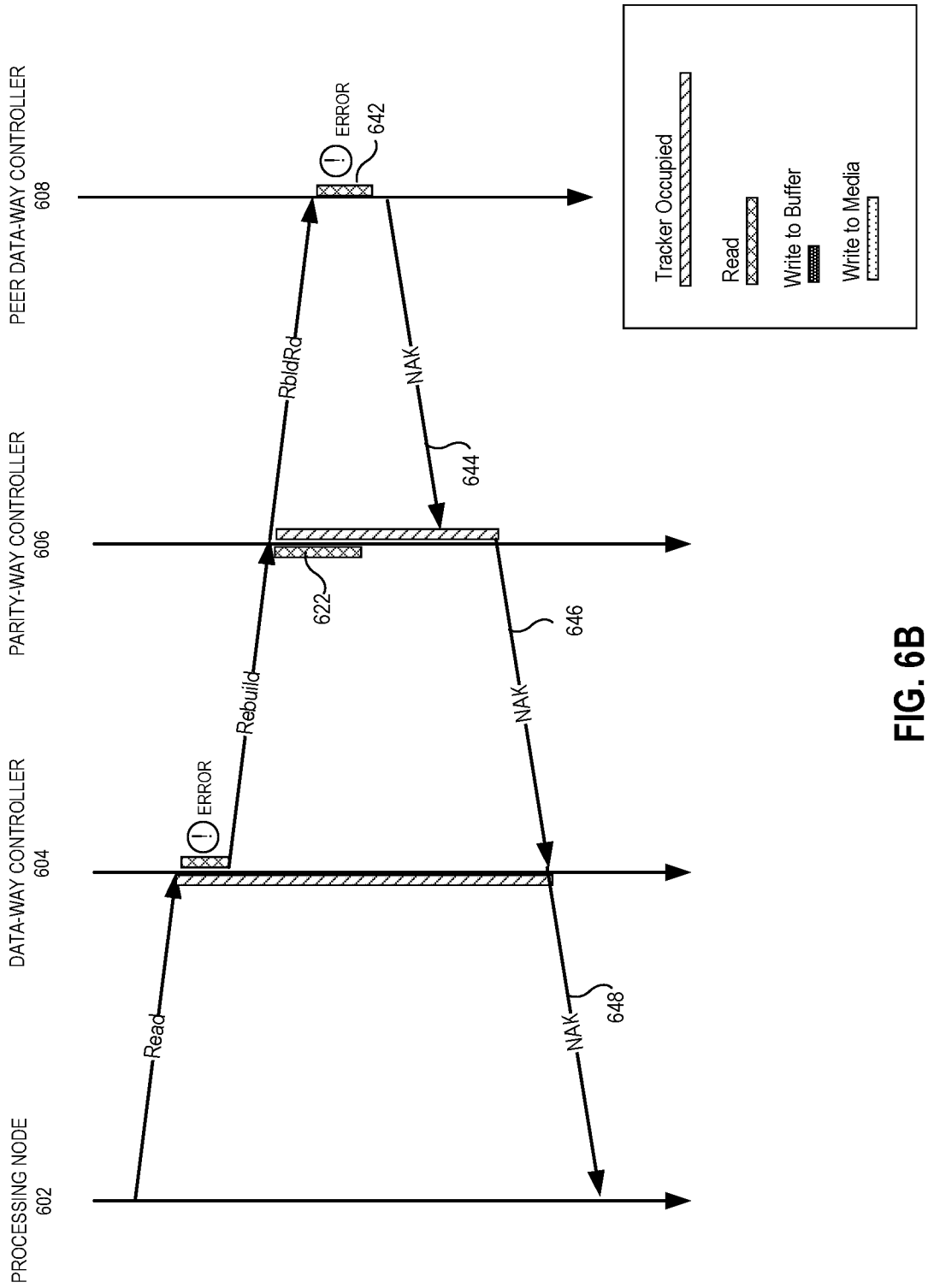
FIG. 6B illustrates a read sequence with multiple errors, according to one aspect of the instant application.

FIG. 6B illustrates a read sequence with multiple errors, according to one aspect of the instant application. The beginning of the read sequence in FIG. 6B can be similar to what is shown in FIG. 6A, including a read error at data-way controller 604 and parity-way controller 606 sending a rebuild-read message to peer data-way controller 608. However, unlike the situation shown in FIG. 6A, in FIG. 6B, peer data-way controller 608 encounters an error during read event 642 and returns an error (NAK) message 644 to parity-way controller 606. This means that, within the same RAID stripe, more than one way fails. In such a situation, although parity-way controller 606 may still receive correct data from other non-failing data-way controllers, it cannot rebuild data for data-way controller 604. As depicted in FIG. 6B, the two failed ways are both data ways. A similar outcome would result if one of the failures was the parity media read (e.g., read event 622). So long as two or more of the ways are unreadable, the stripe is uncorrectable. Consequently, parity-way controller 606 sends an error message 646 to data-way controller 604, notifying data-way controller 604 that the data-rebuilding effort failed, and releases its own tracker. Similarly, data-way controller 604 can send an error message 648 to processing node 602, indicating that the read operation failed, and release its own tracker. This is an example of a failure that exceeds the error correction ability of the RAID scheme.

Referring back to FIG. 6A, unlike the write sequence, the read-rebuild sequence does not cause any temporary stripe inconsistency. The stripe state either remains correctable or, if a scrub is performed successfully, transitions directly from a correctable state to a consistent state. However, the rebuild sequence does depend upon the presence of unchanging values in all the functioning ways of the stripe. Read-rebuild could return corrupt data if a write sequence to the same stripe were permitted to modify data and/or parity values during the time rebuild-read operations are in progress. Thus, the rebuild portion of the read-rebuild sequence is a critical section, requiring serialization relative to any same-stripe writes. As with writes, the critical section of the read-rebuild sequence is contained entirely within the period of time that it occupies the parity-way tracker 620. The parity-way read event 622 and the various data-way reads (e.g., event 626) all occur entirely within the duration of tracker-occupied event 620. Thus, a read-rebuild will not be affected by the temporary stripe inconsistency caused by a concurrent same-stripe write, provided that the parity-way tracker occupancies of the two operations are serialized.

Figure 7:
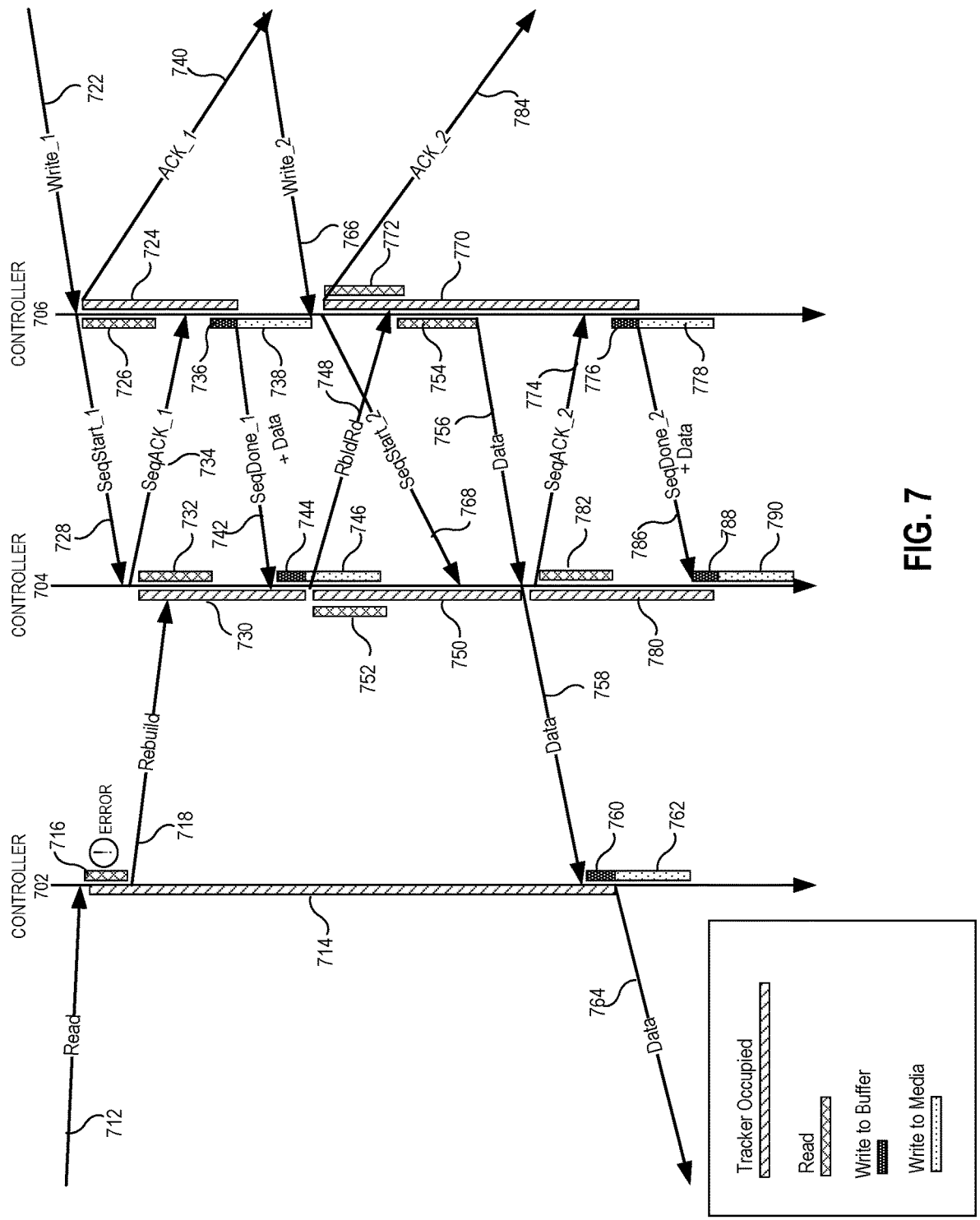
FIG. 7 illustrates a scenario of serialization of multiple tracker-occupied events on a parity-way controller, according to one embodiment.

The same-stripe parity-way occupancy provides the required serialization between critical sections, regardless of the mix of write and read-rebuild activities causing the occupancy. FIG. 7 illustrates a scenario of serialization of multiple tracker-occupied events on a parity-way controller, according to one embodiment. In FIG. 7, there are a number of media controllers (controllers 702-706) that can serve as data-way or parity-way controllers for different RAID stripes. In FIG. 7, a processor issues a read request 712 targeting an address for which controller 702 serves as the data-way controller; and the same processor or a different processor issues a first write request 722 for an address within the same RAID stripe for which controller 706 is the data-way controller. Controller 704 is the parity way controller for the stripe containing the addresses of read request 712 and write request 722. Responsive to first write request 722 arriving while it's tracker for the stripe address is not occupied, controller 706 starts a tracker-occupied event 724, reads the current stored data (read event 726), and sends a sequence-start message 728 to controller 704, which is the parity-way controller for the stripe address. Upon receiving sequence-start message 728 arriving while it's tracker for the stripe address is not occupied, controller 704 starts a tracker-occupied event 730, reads the current stored parity (read event 732), and sends a sequence-acknowledgment message 734 back to data-way controller 706.

In response to receiving read request 712, controller 702 starts a tracker-occupied event 714 and a read event 716. Read event 716 encounters an error, which causes controller 702 to send a rebuild message 718 to controller 704, which serves as the parity-way controller for the RAID stripe. Note that sequence-start message 728 from controller 706 arrives at controller 704 before rebuild message 718 from controller 702. When rebuild message 718 arrives, the parity-way tracker for the particular stripe address is already occupied, as indicated by tracker-occupied event 730. This means that the processing of rebuild message 718 will be delayed.

The operations responsive to write request 722 proceed on both controller 706 and controller 704, including controller 706 starting a tracker occupied event 724, sending an acknowledgment message 740 to the processing node issuing write request 722, writing the data to the write buffer (write-to-buffer event 736), sending a sequence-done message 742 and the data to parity-way controller 704, and writing the data to the storage media (write-to-media event 738); and parity-way controller 704 writing the data to the write buffer (write-to-buffer event 744) and writing the data to the storage media (write-to-media event 746). Note that, after the data has been written to the write buffer, thus becoming visible to subsequent reads, data-way controller 706 ends tracker-occupied event 724. Also note that parity-way controller 704 ends its own tracker-occupied event 730 after receiving sequence-done message 742 and writing the data to the write buffer (write-to-buffer event 744). As discussed previously, releasing the tracker this way can ensure that all media activities associated with the write operation have been completed, such that data and parity visible to subsequent reads remain consistent.

Once the parity-way tracker is released (e.g., tracker-occupied event 730 ends), parity-way controller 704 can process the previously received rebuild message 718. More specifically, parity-way controller 704 can start a tracker-occupied event 750 to track the rebuild process, identify peer data-way controllers based on the RAID-group-mapping table and send a rebuild-read (RbldRd) message 748 to each identified peer data-way controller (e.g., controller 706), starts a tracker-occupied event 750 to track the rebuild process, and reads the current parity (read event 752). Note that the current parity has been updated by the write operation responsive to first write request 722. Upon receiving RbldRd message 748, data-way controller 706 reads its own data (read event 754) and sends the data to parity-way controller 704 via a data message 756. Note that, although similar to a read request, the rebuild-read message received at a data-way controller does not block the normal read or write process; hence, its progress is not tracked by a tracker on the responding controller. Upon receiving the data from all peer data-way controllers, controller 704 can rebuild the requested data for controller 702 based on peer data and the parity. Controller 704 can subsequently send the rebuilt data to data-way controller 702 via a data message 758. Controller 702 can optionally attempt memory scrubbing by writing the data back to the address (write-to-buffer event 760 followed by write-to-media event 762). Data-way controller 702 can also send the data back to the requesting processing node via a data message 764 and end tracker-occupied event 714.

On controller 704, during rebuilding (e.g., while tracker-occupied event 750 is ongoing), controller 704 may receive another sequence-start message 768 from controller 706 for the same stripe address, which sends such a message responsive to a second write-request message 766. Note that the RbldRd message (e.g., message 748) does not trigger a tracker on controller 706. Therefore, controller 706 can start its own operations, including starting tracker-occupied event 770, sending sequence-start message 768, and reading current data (read event 772). However, because controller 704 receives sequence-start message 768 while its tracker is occupied (tracker-occupied event 750 is in progress), the processing of sequence-start message 768 will be delayed until the completion of tracker-occupied event 750.

Once tracker-occupied event 750 ends, controller 704 processes sequence-start message 768, by starting a new tracker-occupied event 780, sending a sequence-acknowledgment message 774 to controller 706, and reading the current parity (read event 782). The rest of the write sequence can include standard operations performed by controller 704 and controller 706, which can include controller 706 writing the data (write-to-buffer event 776 and write-to-media event 778) and controller 704 writing the data (write-to-buffer event 788 and write-to-media event 790). In addition, controller 706 sends an acknowledgment message 784 to the processing node issuing write request 766 and, after writing the data to the write buffer to make the data visible, sends a sequence-done message 786 along with the data to controller 704. The tracker on controller 706 is released (or tracker-occupied event 770 is completed) after the data is written to the write buffer (or the completion of write-to-buffer event 776), and the tracker on controller 704 is released (or tracker-occupied event 770 is completed) after data has been written to the write buffer in both ways.

As one can see from FIG. 7, there are three operations (a read with rebuild and two writes) that overlap in time. All three operations request access to parity way. To ensure stripe consistency, parity-way controller 704 can implement a single tracker module to serialize same-stripe requests to the parity way, as indicated by tracker-occupied events 730, 750, and 780. Note that a subsequent request for the parity way will not be processed unless the tracker for the previous request has been released. Compared with the existing approach that relies on an additional mechanism (e.g., the stripe entering a degraded mode) to serialize requests, this approach can significantly reduce the complexity in implementation. Note that the terms "data-way tracker" and "parity-way tracker" are relative terms, as each RAID-enabled media controller is equipped with the hardware module for tracking progress (e.g., generating and maintaining a tracker entry) of a request to a particular address. If the address stores data, the tracker instance is referred to as a "data-way" tracker and tracks data-way activities associated with the address, whereas if the address stores parity, the tracker instance is referred to as a "parity-way" tracker and tracks parity-way activities associated with the address.

Figure 8A:
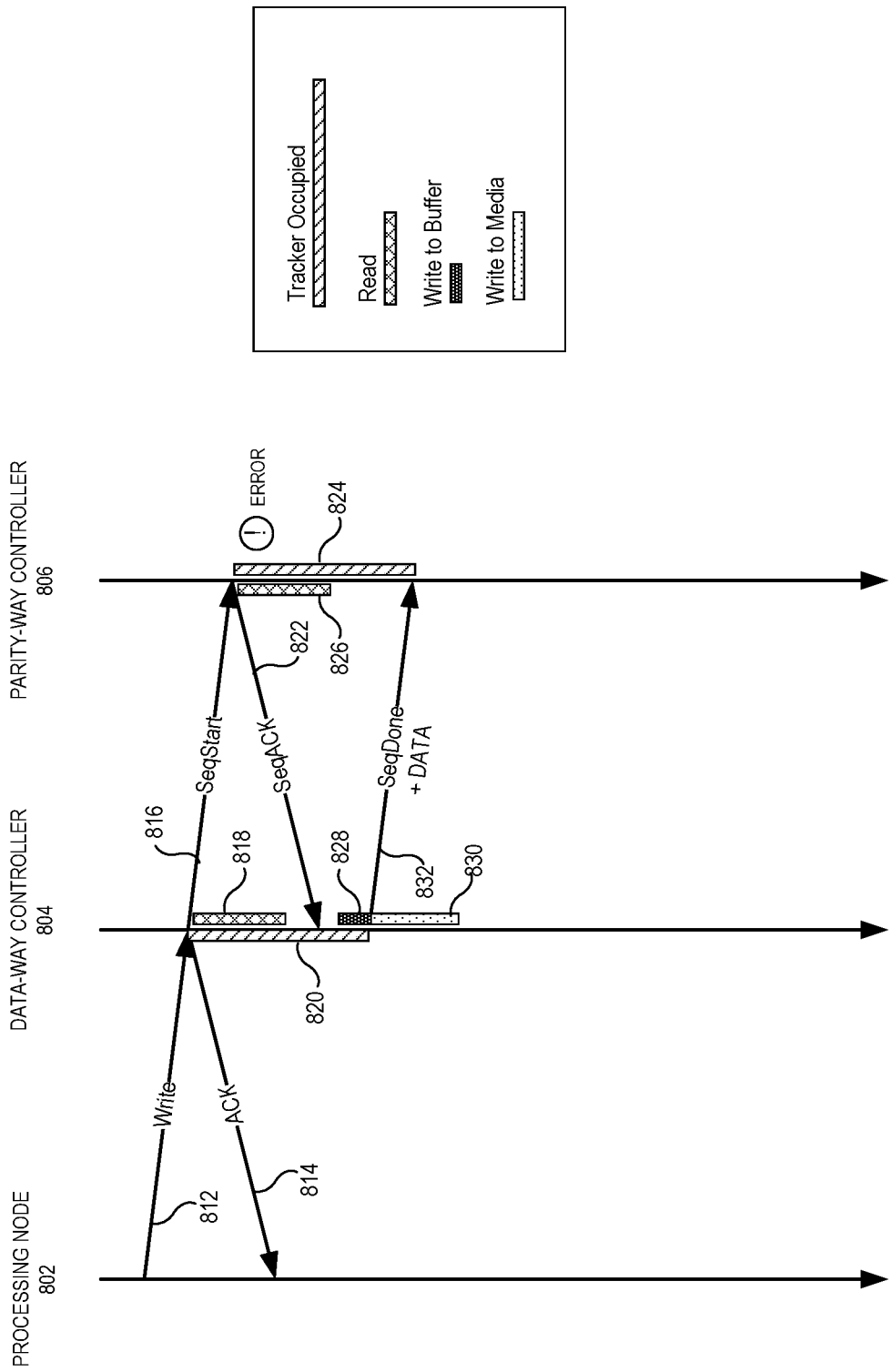
FIG. 8A illustrates a write sequence with a parity error, according to one aspect of the instant application.

In addition to the read errors shown in FIGS. 6A-6B and FIG. 7, other types of error may also occur. The trackers may behave similarly in the various error scenarios to ensure stripe consistency. FIG. 8A illustrates a write sequence with a parity error, according to one aspect of the instant application. In this example, a processing node 802 sends a write request 812 for a particular address to a data-way controller 804, which generates a tracker entry for the address (tracker-occupied event 820), then sends an acknowledgment message 814 to processing node 802. Data-way controller 804 also sends a sequence-start message 816 to parity-way controller 806, and reads data currently stored in the address (read event 818). Upon receiving sequence-start message 816, parity-way controller 806 generates a tracker entry (tracker-occupied event 824), then sends a sequence-acknowledgment message 822 to data-way controller 804, and reads the current parity (read event 826). Read event 826 encounters an error. On the other hand, data-way controller 804 writes the data (write-to-buffer event 828 and write-to-media event 830) and sends a sequence-done message 832 along with data to parity-way controller 806. After the data become visible (or completion of write-to-buffer event 828), data-way controller 804 releases its tracker (or ends tracker-occupied event 820). However, because parity-way controller 806 encounters a read error, the parity will not be updated. Subsequent to receiving sequence-done message 832, parity-way controller 806 ends tracker-occupied event 824. Note that, in this example, there is no demand for scrubbing of the corrupted parity data; the parity data remains unavailable. When there is a demand for scrubbing, parity-way controller 806 can send RbldRd messages to all the peer data ways, recalculate the parity value using XOR operations along with the written data included in sequence-done message 832, and then attempt to write it to parity way media before releasing the parity way tracker entry.

Figure 8B:
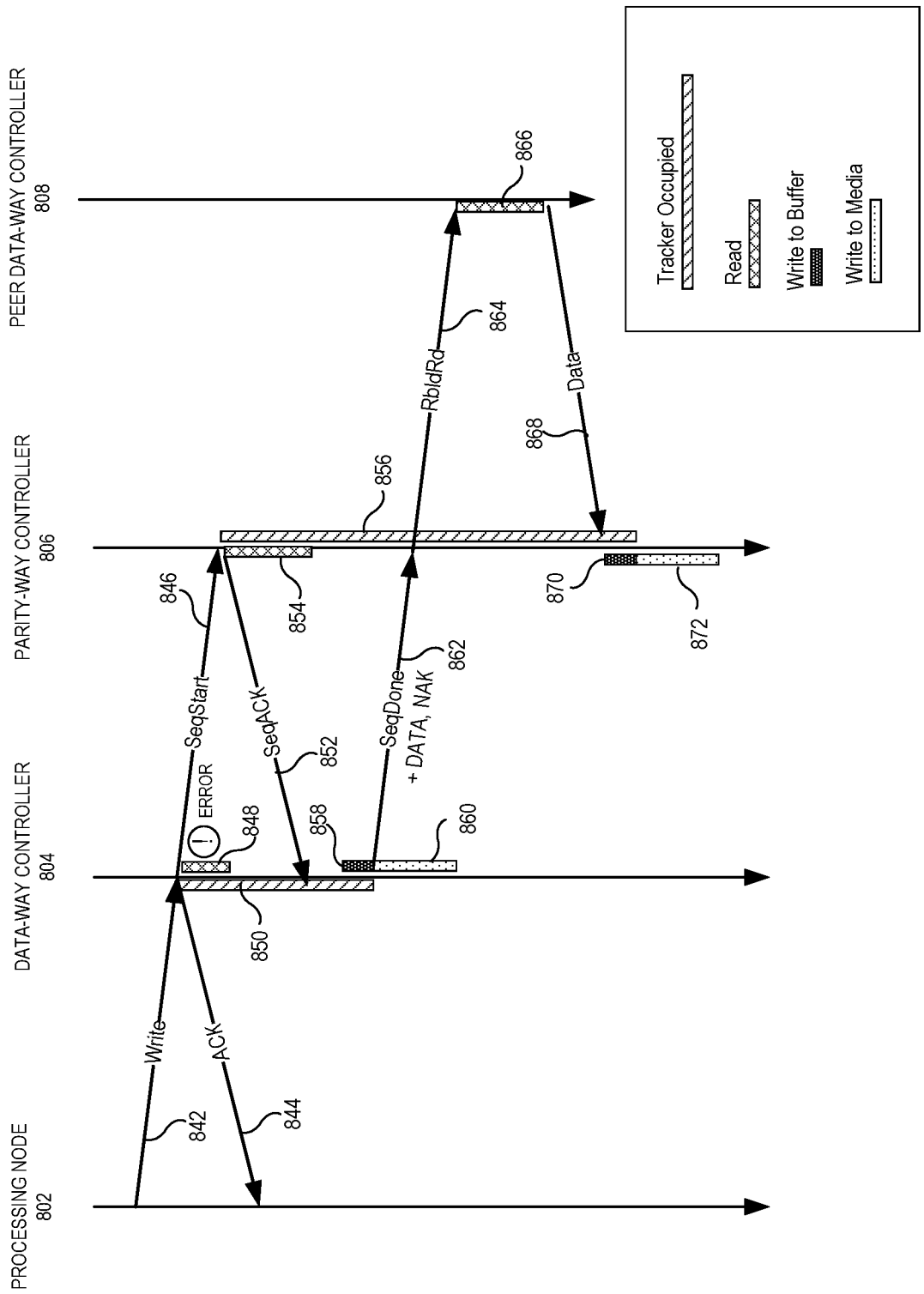
FIG. 8B illustrates a write sequence with a data error, according to one aspect of the instant application.

FIG. 8B illustrates a write sequence with a data error, according to one aspect of the instant application. In this example, processing node 802 sends a write request 842 for a particular access address to data-way controller 804, which generates a tracker entry for the access address (tracker-occupied event 850) and sends an acknowledgment message 844 to processing node 802. Data-way controller 804 also sends a sequence-start message 846 to parity-way controller 806, and reads data currently stored in the address (read event 848). Note that read event 848 encounters an error and cannot retrieve the pre-write data. In some cases, data-way controller 804 may scrub the data (write-to-buffer event 858 and attempted write-to-media event 860) after receiving a sequence-acknowledgment message 852. A scrub write may only be attempted if the data overwrites the entirety of the data block (e.g. cache-line data in a RAID system using cache-line-sized blocks), since a partial write of any subset of a block would depend upon data read in the earlier data-way read (e.g., read event 848). Regardless of whether a data-way scrub write is attempted, and of whether it is successful, parity update must be completed to reflect the written data in the checksum value.

In response to receiving sequence-start message 846, parity-way controller 806 sends back a sequence-acknowledgment message 852, reads the current parity (read event 854), and generates a tracker entry (tracker-occupied event 856). In response to receiving sequence-acknowledgment message 852 and completing write-to-buffer event 858 if applicable, data-way controller 804 releases its tracker (or completes tracker-occupied event 850), and sends a sequence-done message 862 along with the written data and an error message indicating the read failure. Note that correct pre-write data is needed for updating the parity. When data-way controller 804 fails to read the pre-write data, parity-way controller 806 can rebuild the pre-write data from the current parity and the data from other peer data-way controller(s). In this example, parity-way controller 806 sends a rebuild-read (RbldRd) message 864 to peer data-way controller 808, which reads data at the corresponding address (read event 866) and sends the data to parity-way controller 806. Once parity-way controller 806 receives data from all peer data-way controllers, it can rebuild the pre-write data using the received peer data and pre-write parity data. Parity-way controller 806 can further compute the updated parity based on the pre-write data, the current data, and the pre-write parity, and write the updated parity (write-to-buffer event 870 and write-to-media event 872). Note that once the updated parity is written to the buffer or made visible, parity-way controller 806 can release its tracker (or ends tracker-occupied event 856) to allow other processes to access the parity way.

Figure 9:
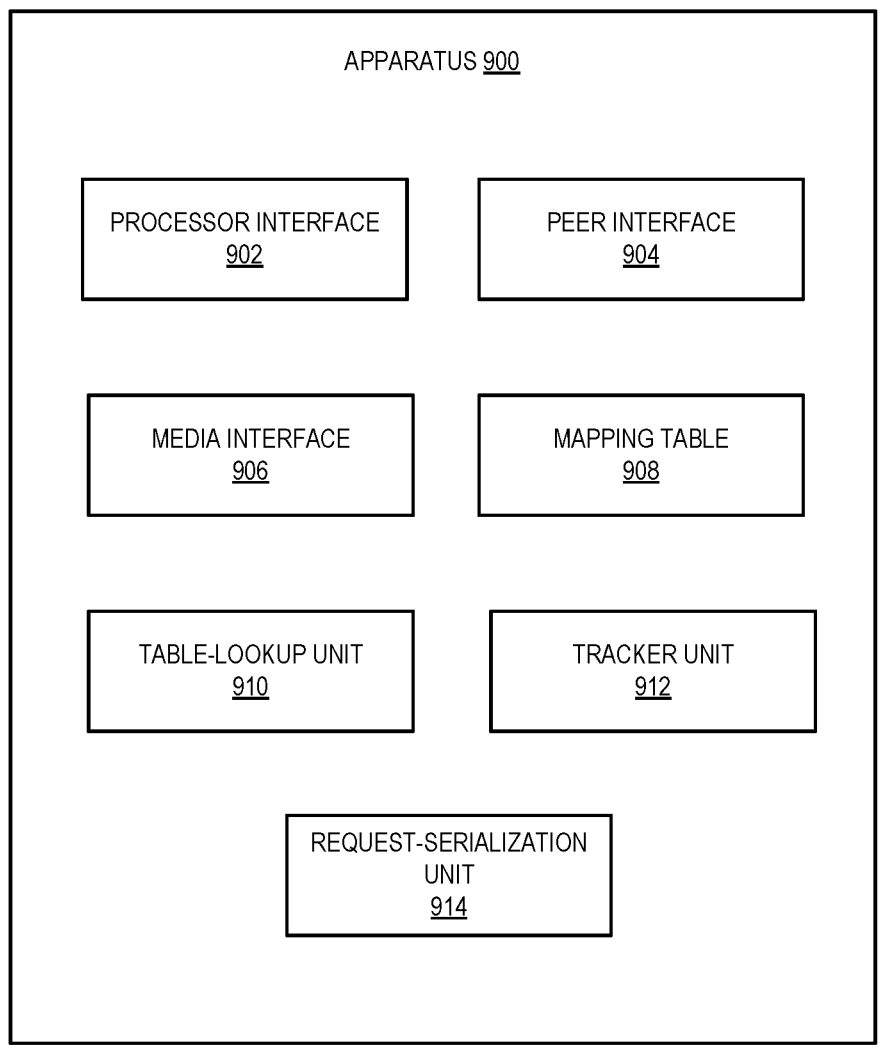
FIG. 9 illustrates an apparatus for facilitating RAID operations in a byte-addressable memory system, according to one aspect of the instant application.

FIG. 9 illustrates an apparatus for facilitating RAID operations in a byte-addressable memory system, according to one aspect of the instant application. Apparatus 900 can include a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. According to one aspect, the various units in apparatus 900 may be implemented using hardware logic to ensure higher processing speed of memory requests. Apparatus 900 can be part of a media controller used in a Gen-Z memory system. The media controller can be used to control media access to a byte-addressable storage medium (e.g., SCM). For example, apparatus 900 can be embedded in a Gen-Z media controller to facilitate RAID operations over a plurality of SCM devices.

Apparatus 900 can include a processor interface 902 for communicating with processing nodes requesting memory accesses, a peer interface 904 for communicating with peer apparatuses embedded in other media controllers, a media interface 906 for accessing data stored in the physical media, a mapping table 908 for storing RAID-group information, a table-lookup unit 910 for looking up mapping table 908, a tracker unit 912 for tracking in-progress operations (e.g., by generating and deleting tracker entries), and a request-serialization unit 914 for serializing media-access requests based on active tracker entries.

For example, during a write operation similar to the one shown in FIG. 5, on the data way, processor interface 902 receives a write request from a processing node (e.g., the CPU of a host computer) via a memory semantic fabric and sends back a write-acknowledgment message; peer interface 904 communicates with a parity-way controller (e.g., sends the sequence-start message, receives the sequence-acknowledgment message, and sends the sequence-done message with data) via the memory semantic fabric; media interface 906 accesses the attached media (reads the pre-write data and writes data to the media); tracker unit 912 starts and ends a tracker-occupied event (e.g., activates and deactivates a tracker entry); and request-serialization unit 914 can ensure that any subsequent request to the data-way address will be delayed until the data-way tracker is released (e.g., the corresponding tracker entry deactivated).

Similarly, on the parity way, peer interface 904 communicates with the data-way controller (e.g., receives the sequence-start message, sends the sequence-acknowledgment message, and receives the sequence-done message with data); media interface 906 accesses the attached media (reads the pre-write parity and writes the updated parity to the media); tracker unit 912 starts and ends a tracker-occupied event (e.g., activates and deactivates a tracker entry); and request-serialization unit 914 can ensure that any subsequent request to the parity-way address will be delayed until the parity-way tracker is released (e.g., the corresponding tracker entry deactivated).

In general, this disclosure provides a RAID solution for byte-addressable memory systems (e.g., an SCM system). Most particularly, the RAID solution is masterless, meaning that no master RAID controller involved. Media controllers in existing SCM architecture can be enhanced (e.g., by including a RAID controller unit) to achieve the cooperative distributive RAID operations. The proposed RAID solution can provide consistency even when multiple requests are made to the same memory location. For example, multiple read or write operations targeting the same memory location can be serialized by the corresponding data-way media controller using a tracker entry for the address. Similarly, parity-way activities (including inquiring and updating of the parity) requested by corresponding data ways of the same stripe can be serialized by the parity-way media controller using a tracker entry. Essentially, the parity-way tracker is to remain occupied during all critical sections that need to be serialized in order to ensure hazard-free operation.

One aspect of the instant application can provide a storage system. The storage system can include a plurality of byte-addressable storage devices and a plurality of media controllers. A respective byte-addressable storage device is to store a parity block or a data block of a data stripe, and a respective media controller is coupled to a corresponding byte-addressable storage device. Each media controller can include a tracker logic block to serialize critical sections of multiple media-access sequences associated with an address on the corresponding byte-addressable storage device. Each media-access sequence comprises one or more read and/or write operations, and the data stripe may be inconsistent during a critical section of a media-access sequence.

In a variation on this aspect, the media access sequences include one or more of: a read sequence, a write sequence, and a read-rebuild sequence.

In a variation on this aspect, the tracker logic block is to generate a tracker entry for the address to serialize accesses to an address.

In a variation on this aspect, each media controller can further include a mapping table that can identify one or more media controllers associated with the data block and the media controller associated with the parity block of the data stripe.

In a variation on this aspect, each media controller can include a processor interface for communicating with one or more processing nodes via a memory semantic fabric and a peer interface for communicating with one or more peer media controllers.

In a variation on this aspect, during a write operation targeting a data block in the data stripe, a media controller associated with the data block is to send a sequence-start message to the media controller associated with the parity block to allow reads of the data block and the parity block to be performed substantially concurrently.

In a further variation, during the write operation, the tracker logic block of the media controller associated with the data block is to delay a subsequent access to the data block until the media controller associated with the data block has received a sequence-acknowledgement message from the parity-way controller responsive to the sequence-start message and until data for the write operation has been written to a write buffer on media controller associated with the data block.

In a further variation, during the write operation, the media controller associated with the parity block is to update the parity block based on the data for the write operation, and the tracker logic block of the media controller associated with the parity block is to delay a subsequent media-access sequence involving the parity block until the data for the write operation has been written to the write buffer on the media controller associated with the data block and the updated parity has been written to a write buffer on the media controller associated with the parity block.

In a further variation, the media controller associated with the data block is to send a message to the media controller associated with the parity block to indicate that the data for the write operation has been written to the write buffer.

In a variation on this aspect, the media controller associated with the data block is to send a rebuild message to the media controller associated with the parity block in response to detecting an error in reading the data block, the media controller associated with the parity block is to rebuild the data block based on the parity block, and the tracker logic block of the media controller associated with the parity block is to block other access to the parity block until completion of rebuilding the data block.

One aspect can provide a method. The method can include: responsive to a media-access request targeting a data block within in a data stripe comprising a parity block and multiple data blocks, identifying a parity-way controller and one or more data-way controllers corresponding to the data stripe. The data stripe is distributed among a plurality of byte-addressable storage devices, the parity-way controller is coupled to a storage device storing the parity block, and a data-way controller is coupled to a storage device storing a data block. The method can also include performing a media-access sequence responsive to the request, which comprises the data-way controller and the parity-way controller serializing critical sections of multiple media-access sequences associated with the data stripe. Each memory-access sequence comprises one or more read and/or write operations, and the data stripe may be inconsistent during a critical section of a media-access sequence. One aspect can provide a redundant array of independent disks (RAID)—enhanced media controller. The RAID-enhanced media controller can include a media interface for attaching a byte-addressable memory device coupled to the RAID-enhanced media controller, a processor interface for communicating with one or more processing nodes issuing memory-access requests, and a peer interface for communicating with one or more peer RAID-enhanced media controllers to cooperatively provide RAID functionalities across a plurality of byte-addressable memory devices respectively attached to a plurality of RAID-enhanced media controllers. The byte-addressable memory device is to store a parity block or a data block of a data stripe. The RAID-enhanced media controller can further include a tracker logic block to serialize critical sections of multiple media-access sequences associated with an address on the byte-addressable storage device. Each media-access sequence comprises one or more read and/or write operations, and the data stripe may be inconsistent during a critical section of a media-access sequence.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, ASIC chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A storage system, comprising:
a plurality of byte-addressable storage devices, wherein a respective byte-addressable storage device is to store a parity block or a data block of a data stripe; and
a plurality of media controllers, wherein a respective media controller is coupled to a corresponding byte-addressable storage device;
wherein each media controller comprises a tracker logic block to serialize critical sections of multiple media-access sequences associated with an address on the corresponding byte-addressable storage device, wherein each media-access sequence comprises one or more read and/or write operations, and wherein the data stripe may be inconsistent during a critical section of a media-access sequence.

2. The storage system of claim 1, wherein the media-access sequences include one or more of:
a read sequence;
a write sequence; and
a read-rebuild sequence.

3. The storage system of claim 1, wherein the tracker logic block is to generate a tracker entry for the address to serialize accesses to an address.

4. The storage system of claim 1, wherein each media controller further comprises a mapping table that identifies one or more media controllers associated with the data block and the media controller associated with the parity block of the data stripe.

5. The storage system of claim 1, wherein each media controller comprises:
a processor interface for communicating with one or more processing nodes via a memory semantic fabric; and
a peer interface for communicating with one or more peer media controllers.

6. The storage system of claim 1, wherein:
during a write operation targeting a data block in the data stripe, a media controller associated with the data block is to send a sequence-start message to the media controller associated with the parity block to allow reads of the data block and the parity block to be performed substantially concurrently.

7. The storage system of claim 6, wherein:
during the write operation, the tracker logic block of the media controller associated with the data block is to delay a subsequent access to the data block until the media controller associated with the data block has received a sequence-acknowledgement message from the parity-way controller responsive to the sequence-start message and until data for the write operation has been written to a write buffer on the media controller associated with the data block.

8. The storage system of claim 7, wherein:
during the write operation, the media controller associated with the parity block is to update the parity block based on the data for the write operation; and
the tracker logic block of the media controller associated with the parity block is to delay a subsequent media-access sequence involving the parity block until the data for the write operation has been written to the write buffer on the media controller associated with the data block and the updated parity has been written to a write buffer on the media controller associated with the parity block.

9. The storage system of claim 7, wherein the media controller associated with the data block is to send a message to the media controller associated with the parity block to indicate that the data for the write operation has been written to the write buffer.

10. The storage system of claim 1, wherein:
the media controller associated with the data block is to send a rebuild message to the media controller associated with the parity block in response to detecting an error in reading the data block;
the media controller associated with the parity block is to rebuild the data block based on the parity block; and
the tracker logic block of the media controller associated with the parity block is to block other accesses to the parity block until completion of rebuilding the data block.

11. A method, comprising:
responsive to a media-access request targeting a data block within a data stripe comprising a parity block and multiple data blocks, identifying a parity-way controller and one or more data-way controllers corresponding to the data stripe, wherein the data stripe is distributed among a plurality of byte-addressable storage devices; wherein the parity-way controller is coupled to a storage device storing the parity block, and wherein a data-way controller is coupled to a storage device storing a data block; and
performing a media-access sequence responsive to the request, which comprises the data-way controller and the parity-way controller serializing critical sections of multiple media-access sequences associated with the data stripe, wherein each memory-access sequence comprises one or more read and/or write operations, and wherein the data stripe may be inconsistent during a critical section of a media-access sequence.

12. The method of claim 11, wherein the media-access sequences include one or more of:
a read sequence;
a write sequence; and
a read-rebuild sequence.

13. The method of claim 11, wherein serializing accesses to the data or parity block comprises generating a tracker entry for an address associated with the data stripe.

14. The method of claim 11, wherein identifying the parity-way controller and the one or more data-way controllers comprises looking up a mapping table and performing a calculation based on an address of the data block targeted by the media-access request and information included in the mapping table.

15. The method of claim 11, wherein performing the write operation comprises the data-way controller sending a sequence-start message to the parity-way controller to allow reads of the data block and the parity block to be performed substantially concurrently.

16. The method of claim 15, wherein performing the write operation comprises delaying a subsequent access to the data block until the data-way controller has received a sequence-acknowledgement message from the parity-way controller responsive to the sequence-start message and until data for the write operation has been written to a write buffer on the data-way controller.

17. The method of claim 16, wherein performing the write operation comprises:
    updating the parity block based on the data for the write operation; and
    delaying execution of a subsequent media-access sequence involving the parity block until the data for the write operation has been written to the write buffer on the data-way controller and the updated parity has been written to a write buffer on the parity-way controller.

18. The method of claim 16, further comprising sending, by the data-way controller, a message to the parity-way controller to indicate that the data for the write operation has been written to the write buffer.

19. The method of claim 11, further comprising:
    sending, by the data-way controller, a rebuild message to the parity-way controller in response to detecting an error in reading the data block;
    rebuilding, by the parity-way controller, the data block based on the parity block; and
    delaying other access to the parity block until completion of rebuilding the data block.

20. A redundant array of independent disks (RAID)—enhanced media controller, comprising:
    a media interface for attaching a byte-addressable memory device coupled to the RAID-enhanced media controller;
    a processor interface for communicating with one or more processing nodes issuing memory-access requests;
    a peer interface for communicating with one or more peer RAID-enhanced media controllers to cooperatively provide RAID functionalities across a plurality of byte-addressable memory devices respectively attached to a plurality of RAID-enhanced media controllers, wherein the byte-addressable memory device is to store a parity block or a data block of a data stripe; and
    a tracker logic block to serialize critical sections of multiple media-access sequences associated with an address on the byte-addressable storage device, wherein each media-access sequence comprises one or more read and/or write operations, and wherein the data stripe may be inconsistent during a critical section of a media-access sequence.

* * * * *